(No Model.)
W. N. COSGROVE.
PUMP
No. 262,279. Patented Aug. 8, 1882.
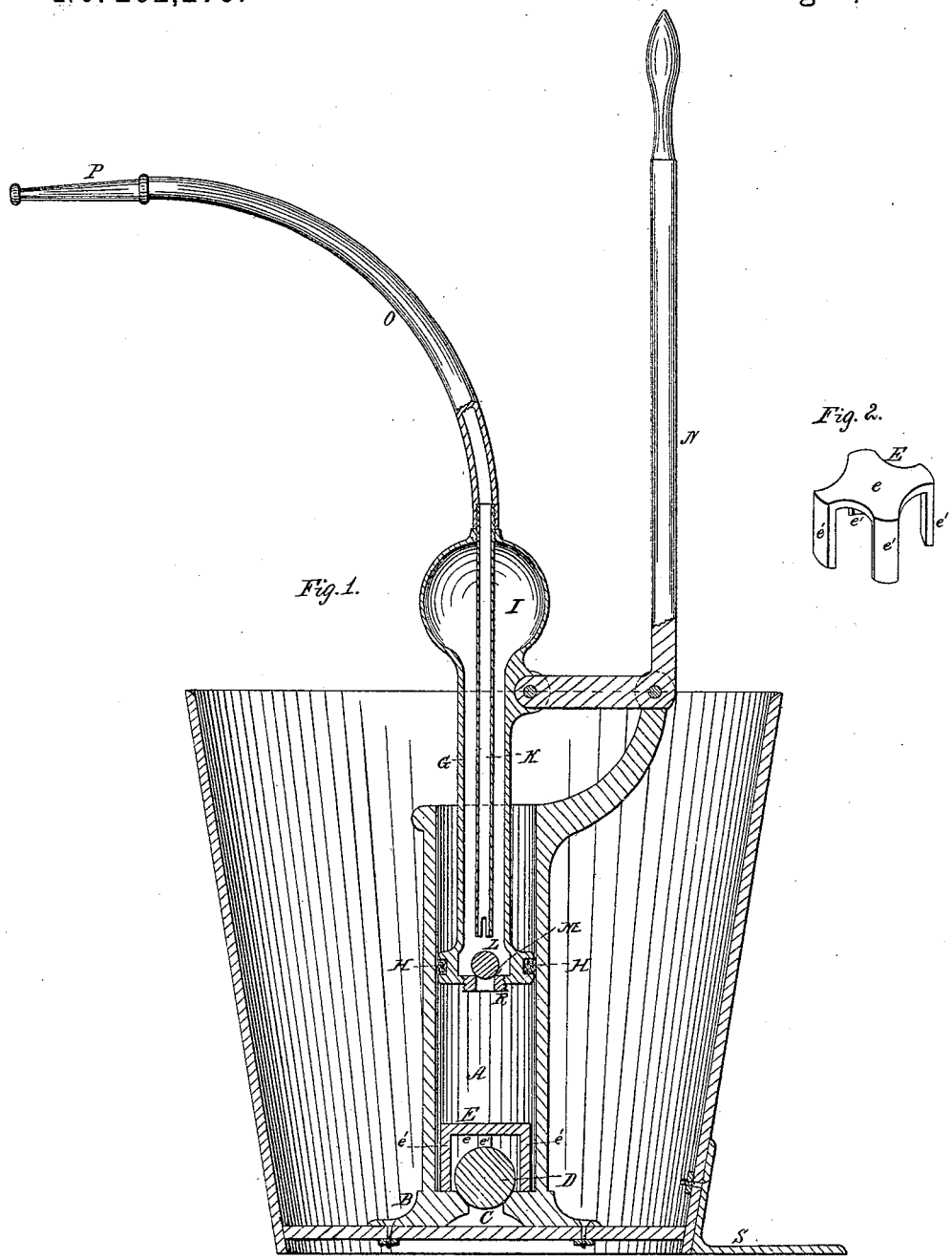
Witnesses:
W. C. Jirdinston
Charles E. Purly
Inventor:
Wm. N. Cosgrove
by
Melville Church
his atty.

derand its induction-port, of the ball-valve

UNITED STATES PATENT OFFICE.

WILLIAM N. COSGROVE, OF FARIBAULT, MINNESOTA, ASSIGNOR TO ROBERT MORRELL, OF PASSAIC, NEW JERSEY.

PUMP.

SPECIFICATION forming part of Letters Patent No. 262,279, dated August 8, 1882.

Application filed May 15, 1882. (No model.)

*To all whom it may concern:*

Be it known that I, WILLIAM N. COSGROVE, of Faribault, in the county of Rice and State of Minnesota, have invented a new and Improved Pump; and I do hereby declare the following to be a full, clear, and exact description of the same, reference being had to the accompanying drawings, forming part of this specification, in which—

Figure 1 is a longitudinal vertical section of my pump applied to a pail. Fig. 2 is a perspective view of the cage or holder for the induction-valve.

Similar letters of reference in both figures indicate the same parts.

My invention relates to an improved hand-pump designed particularly for washing windows, extinguishing fires, for use as a garden-engine, and for other uses; and it consists in certain novelties of construction and combinations of parts, which I will first describe, and then point out specifically in the claims.

Referring to the drawings, A represents the cylinder of the pump, and B the base thereof, in this instance bolted to the bottom of a large-sized pail, as shown. The base B is provided with an induction-port, C, and a valve-seat upon which a ball-valve, D, is adapted to rest.

E represents a loose cage for holding the valve D in proper position. This cage has a top, e, for limiting the upward movement of the valve, and is provided with legs e' and with openings between the legs of sufficient size to permit of a free flow of water upon all sides when the valve is raised. The mere weight of the cage keeps it in position, and no screws or bolts are required for such purpose.

G represents the piston of the pump, having a suitable groove, H, formed in its head for the reception of a proper packing, and provided at its upper end with an enlargement or air-chamber, I, as shown. Where the pump is to be used to pump cold water a leather packing is confined in the groove H; but where hot water is to be pumped a steam-packing should be laid in said groove.

Screwed into the upper end of the air-chamber I, and extending to within a short distance of the piston-head, within the piston, is a pipe, K, and within the piston-head is arranged a ball-valve, L, whose seat M consists simply of a ring, R, screwed into the head, as shown. The lower end of the pipe K is slotted, so that when the valve L rises by the inflow of water into the piston and strikes the end of said pipe the water may freely flow into the pipe.

N is a lever or handle fulcrumed at *n* to an arm attached to or formed with the pump-cylinder, and articulated to a lug on the cylinder, as shown.

A flexible hose, O, having a nozzle, P, is preferably attached to the upper end of the pipe K.

In operating the pump an upward stroke of the piston causes the valve L in the piston to close and the valve D to open, and the water to rise within the cylinder. When a downstroke of the piston is then made the valve D closes and valve L opens, and the water is forced up into the piston and thence into the pipe K, the air compressed in the piston and air-chamber by such operation reacting and causing the flow of water from the nozzle to be uniform and steady.

Where the pump is secured to a pail, as shown, a step, S, is preferably attached to the side of the pail for the operator to place his foot upon to keep the pail and pump steady while working the handle.

Where it is necessary to use a suction-pipe in connection with the pump the said pipe can be screwed to the bottom of the cylinder, as will be readily understood.

The pump is composed of but few parts, and can be manufactured at small cost.

Having thus described my invention, I claim as new—

1. The combination, with the pump-cylinder and its induction-port, of the ball-valve D and the cage E, dropped loosely over the said ball-valve, and operating to limit the movement of the same.

2. The combination, with the hollow piston, of the plain screw-ring screwed thereon and forming the seat for the valve L, with said valve and the pipe K, having the slotted lower end, substantially as described.

3. The combination of the pump-cylinder, the induction-passage and the valve therein, and the cage, with the hollow piston, the air-chamber, the ball-valve in the piston, the pipe K, and the operating lever or handle, substantially as described.

WILLIAM N. COSGROVE.

Witnesses:
JAMES HUNTER,
D. J. SHIPLEY.